(12) United States Patent
Singh

(10) Patent No.: US 12,387,234 B2
(45) Date of Patent: Aug. 12, 2025

(54) SYSTEM AND METHOD TO EVALUATE ENGAGEMENT SCORE OF A SOCIAL MEDIA POST

(71) Applicant: Ravneet Singh, Coral Springs, FL (US)

(72) Inventor: Ravneet Singh, Coral Springs, FL (US)

(73) Assignee: Ravneet Singh, Coral Springs, FL (US)

( * ) Notice: Subject to any disclaimer, the term of this patent is extended or adjusted under 35 U.S.C. 154(b) by 0 days.

(21) Appl. No.: 18/399,828

(22) Filed: Dec. 29, 2023

(65) Prior Publication Data

US 2025/0217842 A1 Jul. 3, 2025

(51) Int. Cl.
- *G06Q 30/02* (2023.01)
- *G06Q 30/0242* (2023.01)
- *G06Q 50/00* (2012.01)

(52) U.S. Cl.
CPC ......... *G06Q 30/0242* (2013.01); *G06Q 50/01* (2013.01)

(58) Field of Classification Search
CPC .............. G06Q 30/0242; G06Q 50/01; G06Q 30/0207–30/0277
See application file for complete search history.

(56) References Cited

U.S. PATENT DOCUMENTS

| | | | |
|---|---|---|---|
| 10,110,545 B1 | 10/2018 | Freay et al. | |
| 10,242,074 B2 | 3/2019 | Kazi et al. | |
| 10,776,424 B2 * | 9/2020 | Mullaney | H04L 51/234 |
| 2013/0204871 A1 * | 8/2013 | Wong | G06F 16/9538 |
| | | | 707/732 |
| 2013/0325550 A1 * | 12/2013 | Varghese | G06Q 50/01 |
| | | | 705/7.31 |
| 2015/0310018 A1 * | 10/2015 | Fan | G06F 16/9535 |
| | | | 707/734 |
| 2016/0117328 A1 * | 4/2016 | Mondal | G06Q 50/01 |
| | | | 707/725 |
| 2016/0321261 A1 * | 11/2016 | Spasojevic | G06F 16/9566 |
| 2017/0262451 A1 * | 9/2017 | Milner | G06F 16/285 |
| 2018/0189402 A1 * | 7/2018 | Mullaney | G06Q 50/01 |
| 2018/0218458 A1 * | 8/2018 | Benfield | G06F 16/41 |
| 2019/0123889 A1 * | 4/2019 | Schmidt-Karaca | H04L 9/0618 |
| 2019/0156351 A1 * | 5/2019 | Akkiraju | G06Q 30/0269 |
| 2019/0197069 A1 * | 6/2019 | Fan | G06F 16/9535 |
| 2019/0251579 A1 * | 8/2019 | Savelli | H04L 67/535 |
| 2020/0201854 A1 * | 6/2020 | Miller | G06F 16/2255 |

(Continued)

*Primary Examiner* — Thuy N Nguyen

(74) *Attorney, Agent, or Firm* — Jason C. Cameron

(57) ABSTRACT

A system to evaluate engagement score of at least one of a social media post is disclosed. The system includes a processing subsystem including a registration module to register users in an integrated database by creating user profile. The registration module is to link social media platforms associated with the users with the user profile. The processing subsystem includes a bio page module to fetch parameters corresponding to the social media post from the social media platforms. The bio page module is to generate hash value corresponding to the parameters to append the parameters in a blockchain network. The processing subsystem includes a scoring module to normalize the number of likes, the number of shares and the number of comments to obtain respective normalized values. The scoring module is to add the respective normalized values upon multiplying the respective normalized values to obtain the engagement score.

20 Claims, 5 Drawing Sheets

(56) References Cited

U.S. PATENT DOCUMENTS

| | | | |
|---|---|---|---|
| 2020/0356925 A1* | 11/2020 | Papadimitriou | G06Q 10/0637 |
| 2021/0021426 A1* | 1/2021 | Scherrer | H04L 9/3218 |
| 2021/0065236 A1* | 3/2021 | Khan | G06Q 30/0253 |
| 2021/0097240 A1* | 4/2021 | Singh | G06F 40/253 |
| 2021/0201349 A1* | 7/2021 | Singh | G06N 20/00 |
| 2022/0292543 A1* | 9/2022 | Henderson | G06Q 30/0252 |
| 2024/0185235 A1* | 6/2024 | Park | G06F 21/64 |

\* cited by examiner

SYSTEM AND METHOD TO EVALUATE ENGAGEMENT SCORE OF A SOCIAL MEDIA POST

FIELD OF INVENTION

Embodiments of the present disclosure relate to a field of data processing and more particularly to a system and a method to evaluate engagement score of at least one of a social media post.

BACKGROUND

Social media platforms have become integral channels for communication, information sharing, and networking. The social media platforms facilitate creation and exchange of content among users, fostering real-time interactions in virtual communities. Quantifying engagement of social media posts is necessary to promote interaction between influencers and followers, enabling influencers to monetize social media posts by engaging with brands.

Current systems are inefficient in integrating multiple social media platforms associated with the influencers and quantifying the engagement of the social media posts of the influencers. Also, the current systems fail to support collaborations between the brands and the influencers upon quantifying the engagement. Further, the current systems are sluggish to ensure data privacy. Furthermore, inability of the existing system to submit the social media posts to multiple social media platforms through a single user interface forces the influencers to manually post the same on multiple social media platforms, requiring additional time and effort and increasing the risk of errors.

Hence, there is a need for an improved system and method to evaluate engagement score of at least one of a social media post to address the aforementioned issue(s).

BRIEF DESCRIPTION

In accordance with an embodiment of the present disclosure, a system to evaluate engagement score of at least one of a social media post is provided. The system includes a processing subsystem hosted on a server and configured to execute on a network to control bidirectional communications among a plurality of modules. The processing subsystem includes a registration module operatively coupled to an integrated database. The registration module is configured to register one or more users in an integrated database by creating corresponding user profile upon receiving one or more user details. The one or more users includes a brand, an influencer, and a follower. The registration module is also configured to link one or more social media platforms associated with each of the one or more users with the corresponding user profile upon registering the one or more users. The processing subsystem also includes a bio page module operatively coupled to the registration module. The bio page module is configured to fetch a plurality of parameters corresponding to at least one of the social media post from each of the one or more social media platforms through a corresponding application programing interface to render the plurality of parameters in a user interface associated with a user device. The plurality of parameters includes number of likes, number of mentions, number of comments, number of shares and number of hashtags, and reach. The bio page module is also configured to generate hash value corresponding to the plurality of parameters to append the plurality of parameters in a blockchain network. The processing subsystem also includes a scoring module operatively coupled to the bio page module. The scoring module is configured to normalize the number of likes, the number of shares and the number of comments secured by the at least one of the social media post during a predefined interval to obtain normalized number of likes, normalized number of shares and the normalized number of comments respectively. The scoring module is also configured to add the normalized number of likes, normalized number of shares and the normalized number of comments upon multiplying the normalized number of likes, normalized number of shares and the normalized number of comments with corresponding weight to obtain the engagement score, thereby evaluating the engagement score of at least one of the social media post.

In accordance with another embodiment of the present disclosure, a method to evaluate engagement score of at least one of a social media post is provided. The method includes registering, by a registration module, one or more users in an integrated database by creating corresponding user profile upon receiving one or more user details. The one or more users includes a brand, an influencer, and a follower. The method also includes linking, by the registration module, one or more social media platforms associated with each of the one or more users with the corresponding user profile upon registering the one or more users. The method also includes fetching, by the bio page module, a plurality of parameters corresponding to at least one of the social media post from each of the one or more social media platforms through a corresponding application programing interface to render the plurality of parameters in a user interface associated with a user device. The plurality of parameters includes number of likes, number of mentions, number of comments, number of shares and number of hashtags, and reach. The method also includes generating, by the bio page module, hash value corresponding to the plurality of parameters to append the plurality of parameters in a blockchain network. The method further includes normalizing, by a scoring module, the number of likes, the number of shares and the number of comments secured by the at least one of the social media post during a predefined interval to obtain normalized number of likes, normalized number of shares and the normalized number of comments respectively. The method also includes adding, by the scoring module, the normalized number of likes, normalized number of shares and the normalized number of comments upon multiplying the normalized number of likes, normalized number of shares and the normalized number of comments with corresponding weight to obtain the engagement score, thereby evaluating the engagement score of at least one of the social media post.

In accordance with another embodiment of the present disclosure, a non-transitory computer-readable medium storing a computer program that, when executed by a processor, causes the processor to perform a method to evaluate engagement score of at least one of a social media post is provided. The method includes registering, by a registration module, one or more users in an integrated database by creating corresponding user profile upon receiving one or more user details. The one or more users includes a brand, an influencer, and a follower. The method also includes linking, by the registration module, one or more social media platforms associated with each of the one or more users with the corresponding user profile upon registering the one or more users. The method also includes fetching, by the bio page module, a plurality of parameters corresponding to at least one of the social media post from each of the one or more social media platforms through a corresponding application programing interface to render the plurality of parameters in a user interface associated with a user device. The plurality of parameters includes number of likes, number of mentions, number of comments, number of shares and number of hashtags, and reach. The method also includes generating, by the bio page module, hash value corresponding to the plurality of parameters to append the plurality of parameters in a blockchain network. The method further includes normalizing, by a scoring module, the number of likes, the number of shares and the number of comments secured by the at least one of the social media post during a predefined interval to obtain normalized number of likes, normalized number of shares and the normalized number of comments respectively. The method also includes adding, by the scoring module, the normalized number of likes, normalized number of shares and the normalized number of comments upon multiplying the normalized number of likes, normalized number of shares and the normalized number of comments with corresponding weight to obtain the engagement score, thereby evaluating the engagement score of at least one of the social media post.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
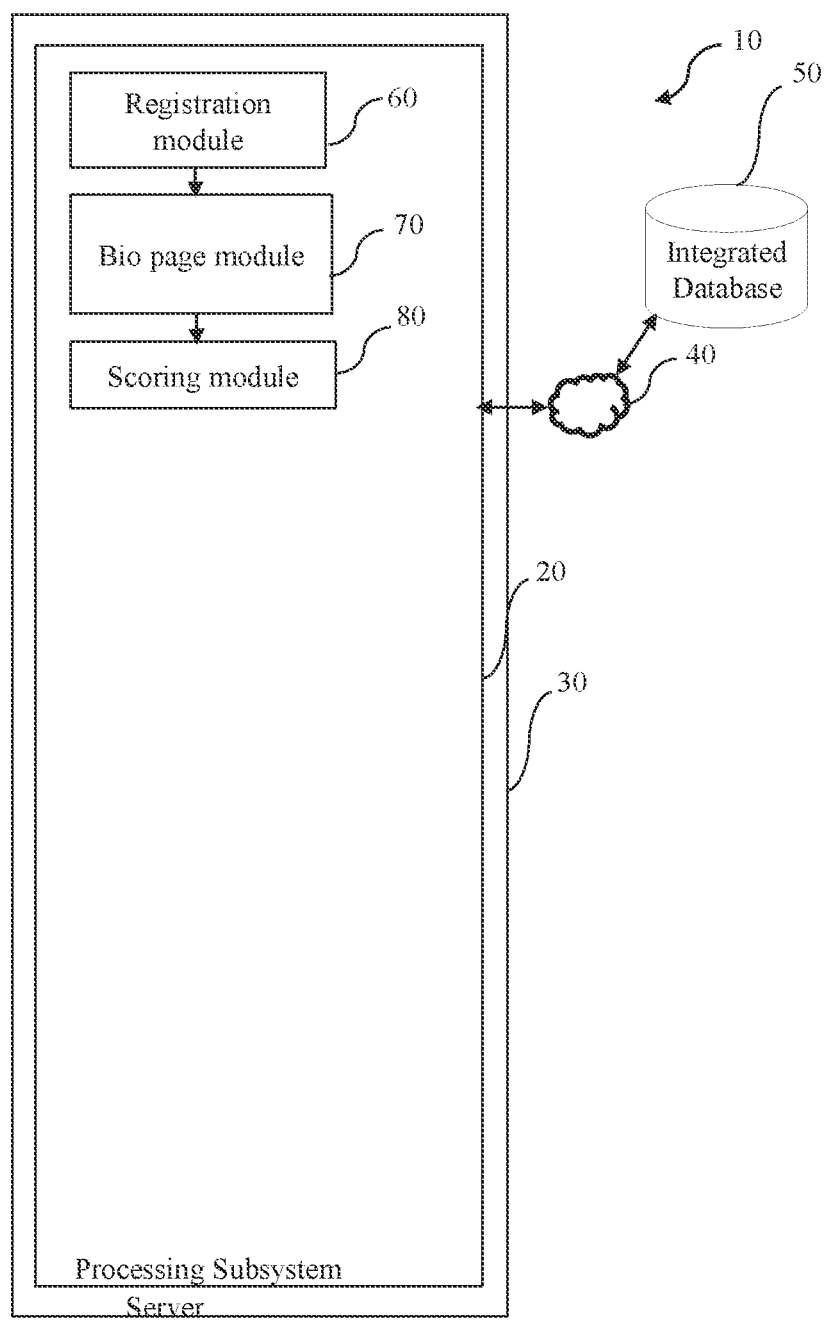
FIG. 1 is a block diagram representation of a system to evaluate engagement score of at least one of a social media post in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

In the discussion that follows, references will be made to "first level", and "second level" with reference to various data storage levels defined in an integrated database for data storage and representational purposes. In the discussion that follows, references will be made to "first level user", and "second level user" with reference to users associated with the first level and the second level respectively.

Embodiments of the present disclosure relate to a system and a method to evaluate engagement score of at least one of a social media post. The system includes a processing subsystem hosted on a server and configured to execute on a network to control bidirectional communications among a plurality of modules. The processing subsystem includes a registration module operatively coupled to an integrated database. The registration module is configured to register one or more users in an integrated database by creating corresponding user profile upon receiving one or more user details. The one or more users includes a brand, an influencer, and a follower. The registration module is also configured to link one or more social media platforms associated with each of the one or more users with the corresponding user profile upon registering the one or more users. The processing subsystem also includes a bio page module operatively coupled to the registration module. The bio page module is configured to fetch a plurality of parameters corresponding to at least one of the social media post from each of the one or more social media platforms through a corresponding application programing interface to render the plurality of parameters in a user interface associated with a user device. The plurality of parameters includes number of likes, number of mentions, number of comments, number of shares and number of hashtags, and reach. The bio page module is also configured to generate hash value corresponding to the plurality of parameters to append the plurality of parameters in a blockchain network. The processing subsystem also includes a scoring module operatively coupled to the bio page module. The scoring module is configured to normalize the number of likes, the number of shares and the number of comments secured by the at least one of the social media post during a predefined interval to obtain normalized number of likes, normalized number of shares and the normalized number of comments respectively. The scoring module is also configured to add the normalized number of likes, normalized number of shares and the normalized number of comments upon multiplying the normalized number of likes, normalized number of shares and the normalized number of comments with corresponding weight to obtain the engagement score, thereby evaluating the engagement score of at least one of the social media post.

FIG. 1 is a block diagram representation of a system 10 to evaluate engagement score of at least one of a social media post in accordance with an embodiment of the present disclosure. The system 10 includes a processing subsystem 20 hosted on a server 30 and configured to execute on a network 40 to control bidirectional communications among a plurality of modules. Further, in one embodiment, the server 30 may be a cloud-based server. In another embodiment, the server 30 may be a local server. In one example, the network 40 may be a private or public local area network (LAN) or wide area network (WAN), such as the Internet.

Further, in another embodiment, the network 40 may include both wired and wireless communications according to one or more standards and/or via one or more transport mediums. Furthermore, in one example, the network 40 may include wireless communications according to one of the 802.11 or Bluetooth specification sets, or another standard or proprietary wireless communication protocol. In yet another embodiment, the network 40 may also include communications over a terrestrial cellular network, including, a GSM (global system for mobile communications), CDMA (code division multiple access), and/or EDGE (enhanced data for global evolution) network.

Furthermore, the processing subsystem 20 includes a registration module 60 operatively coupled to an integrated database 50. In one embodiment, the integrated database 50 may include a structured query language database. In some embodiments, the integrated database 50 may include a non-structured query language database. The registration module 60 is configured to register one or more users in an integrated database 50 by creating corresponding user profile upon receiving one or more user details. In one embodiment, the one or more user details may include an email address and a phone number. The one or more users includes a brand, an influencer, and a follower. In one embodiment, the influencer may include a speaker, a leader, a businessman, a social media user, and the like. Similarly, in some embodiments, the follower may also be interpreted as an audience, a voter, a shareholder, an investor, fans, and the like. For an example, consider a scenario in which, the registration module 60 may register a brand X, an influencer Y and a follower Z in the integrated database 50 by creating the corresponding user profile upon receiving respective email address and phone numbers of the brand X, the influencer Y and the follower Z.

Moreover, the registration module 60 is configured to link one or more social media platforms associated with each of the one or more users with the corresponding user profile upon registering the one or more users. In continuation with the ongoing example, consider a scenario in which, the brand X may be operating a facebook page, the influencer Y may be operating the facebook page, an instagram account, and a twitter account, and a follower may be operating the facebook page and the instagram account. Upon creating the corresponding user profile of the brand X, the registration module 60 may link the facebook page associated with the brand X to the corresponding user profile of the brand X. Similarly, upon creating the corresponding user profile of the influencer Y, the registration module 60 may link the facebook page, the instagram account, and the twitter account associated with the influencer Y to the corresponding user profile of the influencer Y. The registration module 60 may also link the facebook page and the instagram account associated with the follower Z to the corresponding user profile of the follower Z.

Additionally, the processing subsystem 20 includes a bio page module 70 operatively coupled to the registration module 60. The bio page module 70 is configured to fetch a plurality of parameters corresponding to at least one of the social media post from each of the one or more social media platforms through a corresponding application programing interface to render the plurality of parameters in a user interface associated with a user device. The plurality of parameters includes number of likes, number of mentions, number of comments, number of shares and number of hashtags, and reach. In detail, the number of likes may be total number of likes secured by at least one of the social media post. The number of comments may include total number of comments secured by at least one of the social media post. The number of shares may include total number of shares secured by at least one of the social media post. In one embodiment, the number of shares may include retweets of at least one of the social media post.

Moreover, in some embodiments, the plurality of parameters may also include total number of reactions secured by at least one of the social media post, total number of clicks secured by at least one of the social media post, total number of clicks on a link present in at least one of the social media post, total number views secured by a video present in at least one of the social media post, total number of plays secured by the video present in at least one of the social media post, total number of plays secured by the video present in at least one of the social media post for a predefined duration, total number of views secured by a media present in at least one of the social media post, engagement rate of at least one of the social media post, view rate of at least one of the social media post, click through rate of at least one of the social media post, and the like. In such an embodiment, the reactions may include a heart symbol, a smiley emoji, a wow emoji, a sad emoji, and a mad emoji.

Also, in some embodiments, the clicks secured by at least one of the social media post may include a click on an image present in at least one of the social media post, the click on a hash tag present in at least one of the social media post, the click on a user handle present in at least one of the social media post, the click on a universal resource locator present in at least one of the social media post. In some embodiments, the media may include an image, the video, and the like. As used herein, the engagement rate may be defined as a measure of how many times at least one of the social media post is engaged with, out of how times may at least one of the social media post is viewed. As used herein, the view rate may be defined as a measure of how many times the video present in at least one of the social media post was viewed for a predefined duration. As used herein, the click through rate may be a measure of how many times a link in at least one of the social media post was clicked out of how many times the link was viewed.

Further, in one embodiment, the user device may include a phone, a computer, a tab and a personal digital assistant. The bio page module 70 is also configured to generate hash value corresponding to the plurality of parameters to append the plurality of parameters in a blockchain network. In one embodiment, the blockchain network may include a public blockchain network. In some embodiments, the blockchain network may include a private blockchain network. In a specific embodiment, the blockchain network may include a shared blockchain network.

Also, in continuation with the ongoing example, the bio page module 70 may fetch the number of likes, the number of mentions, the number of comments, the number of shares and the number of hashtags, and the reach secured by the facebook page of the brand X to render the same in the graphical user interface of the computer of the brand X. The bio page module 70 may generate the hash value corresponding to the number of likes, the number of mentions, the number of comments, the number of shares and the number of hashtags, and the reach secured by the facebook page of the brand X to append the same in the blockchain network. Similarly, the bio page module 70 may fetch the number of likes, the number of mentions, the number of comments, the number of shares and the number of hashtags, and the reach secured by the facebook page, the instagram account, and the twitter account associated with the influencer Y to render the same in the graphical user interface of the phone of the influencer Y.

Further, the bio page module 70 may generate the hash value corresponding to the number of likes, the number of mentions, the number of comments, the number of shares and the number of hashtags, and the reach secured by the facebook page of the influencer Y to append the same in the blockchain network. Also, the bio page module 70 may fetch the number of likes, the number of mentions, the number of comments, the number of shares and the number of hashtags, and the reach secured by the facebook page, and the instagram account associated with the follower Z to render the same in the graphical user interface of the phone of the follower Z. The bio page module 70 may generate the hash value corresponding to the number of likes, the number of mentions, the number of comments, the number of shares and the number of hashtags, and the reach secured by the facebook page of the follower Z to append the same in the blockchain network.

Furthermore, the processing subsystem 20 includes a scoring module 80 operatively coupled to the bio page module 70. The scoring module 80 is configured to normalize the number of likes, the number of shares and the number of comments secured by the at least one of the social media post during a predefined interval to obtain normalized number of likes, normalized number of shares and the normalized number of comments respectively. In one embodiment, the predefined interval may include days, months, and years. The scoring module 80 is also configured to add the normalized number of likes, normalized number of shares and the normalized number of comments upon multiplying the normalized number of likes, normalized number of shares and the normalized number of comments with corresponding weight to obtain the engagement score, thereby evaluating the engagement score of at least one of the social media post. In one embodiment, the scoring module 80 may normalize the plurality of parameters to obtain normalized parameters. In such an embodiment, the scoring module 80 may add the normalized parameters upon multiplying the normalized parameters with the corresponding weight to obtain the engagement score.

Moreover, considering the easiness of explanation, the exemplary scenarios are being described considering only the influencer Y here onwards. In continuation with the ongoing example, the scoring module 80 may normalize the number of likes, the number of shares and the number of comments secured by the at least one of the social media post made by the influencer Y to obtain respective normalized values. Consider a scenario in which at least one of the social media post of the influencer Y has secured 5 likes, 10 comments and 3 shares and the corresponding normalized values are 0.5, 0.1 and 0.3 respectively. Consider an instance in which the corresponding weight assigned to likes, comments and shares may be 10, 20 and 15 respectively. The scoring module 80 may multiply 0.5, 0.1 and 0.3 with the corresponding weights and add the results to obtain the engagement score as follows. $(0.5\times10)+(0.1\times20)+(0.3\times15)=11.5$.

Additionally, in one embodiment, the scoring module 80 may be configured to evaluate at least one sentiment polarity associated with the number of likes secured by the at least one of the social media post based on selection of one or more emoticons associated with the at least one of the social media post by an audience. As used herein, the one or more emoticons may be defined as combinations of keyboard characters used to represent facial expressions or convey emotions in written communication, such as text messages, emails, and online chat. In one embodiment the at least one sentiment polarity may include positive sentiment polarity, negative sentiment polarity, and neutral sentiment polarity. In such an embodiment, the scoring module 80 may also be configured to compute the corresponding weight of the normalized number of likes based on the at least one sentiment polarity evaluated. In one embodiment, the positive sentiment polarity, negative sentiment polarity, and neutral sentiment polarity may be represented by a sentiment intensity score lies between zero and a positive value, zero and a negative value, and zero respectively.

Further, in continuation with the ongoing example, consider the scenario in which out of the 5 likes secured by the at least one of the social media post of the influencer Y includes 3 happy emoticons, 1 neutral emoticon and 1 angry emoticon. The sentiment polarity evaluated by the scoring module 80 may be the positive sentiment polarity considering the 3 happy emoticons. The scoring module 80 may compute the corresponding weight of the normalized number of likes based on the at least one sentiment polarity evaluated. In one embodiment, the scoring module 80 may also evaluate the sentiment polarity based on a skin tone of the one or more emoticons selected by the audience.

Furthermore, in one embodiment, the scoring module 80 may be configured to compute the corresponding weight of the normalized number of comments based on number of words present in one or more comments secured by the at least one of the social media post, tonality of the one or more comments, tone intensity of the one or more comments, and persona profile of the one or more persons. In such an embodiment, the tonality of one or more comments may include a first category and a second category. In one embodiment, the first category may include joyful tone, sad tone, angry tone, and fearful tone. In some embodiments, the second category may include analytical tone, tentative tone, and confident tone. In one embodiment, the tone intensity lies between zero and one. In such an embodiment, zero may represent absence of any tone and a positive value between the zero and one represents presence of a tone.

Moreover, in continuation with the ongoing example, consider the scenario in which, the 10 comments secured by at least one of the social media post of the influencer Y include a total of 50 words. The scoring module 80 may also try to analyze tonality of each of the 10 comments through a plurality of steps including tokenization, text preprocessing, feature extraction, sentiment analysis, and tonality analysis. In detail, tokenization involves breaking each of the 10 comments into words, and phrases. The text preprocessing involves removal of noise and irrelevant information from the words and phrases. Further the words and the phrases may get converted into corresponding numerical vectors using in the feature extraction step.

Additionally, later during the sentimental analysis step, various underlying sentiments from the words are figured out. Once the underlying sentiments are figured out, the tonality analysis of the words are performed using trained natural language processing models to identify various emotions associated with the words. The natural language processing technique may also evaluate the tone intensity of each of the 10 comments. The scoring module 80 may be configured to compute the corresponding weight of the normalized number of comments based on number of words present in one or more comments secured by the at least one of the social media post, tonality of the one or more comments, tone intensity of the one or more comments, presence of jargons in the one or more comments, and persona profile of the one or more users. In one embodiment, persona profile of the one or more users may be identified based on at least one of a title of the one or more users, social status of the one or more users, role of the one or more users, designation of the one or more users and the like.

Also, in one embodiment, the scoring module 80 may be configured to compute the engagement score of the at least one of the social media post based on at least one of a frequency of deviation, and a volatility of the at least one of the social media post. In such an embodiment, the frequency of deviation may be calculated by subtracting average number of social media posts from number of at least one of the social media post during a predefined time period. In one embodiment, the predefined time period may include days, months, and years. In one embodiment, the volatility may be calculated by dividing standard deviation of number of at least one of the social media post by mean deviation of the number of at least one of the social media post.

Further, in continuation with the ongoing example, consider a scenario in which number of social media posts made by the influencer Y for one week may be as follows: 8, 15, 12, 8, 18, 20, 10. The scoring module 80 may calculate the average of total number of the social media posts made by the influencer Y for one week as 13 and the frequency of deviation for the week is 5, −2, 1, 5, −5, −7, and 3. The scoring module 80 may also calculate the volatility as 1.04 by diving the standard deviation of 4.16 by the mean deviation of 4. Based on the frequency of deviation calculated, the scoring module 80 may infer a relatively high level of variation in daily performance and may compute the engagement score accordingly.

Furthermore, in some embodiments, the scoring module 80 may be configured to compute the engagement score of the at least one of the social media post based on one or more lingos secured by the at least one of the social media post. In such an embodiment, the one or more lingos may include at least one of symbols comprising @, #, retweet, a universal resource locator, an emoji, an emoticon, abbreviations, and capitalizations. As used herein, the emoji may be defined as digital images or icons used to express an idea, emotion, or concept in electronic communication. As used herein, the emoticon, short for "emotion icon," is a sequence of keyboard characters used to represent a facial expression or convey an emotion in written communication. In one embodiment, the scoring module80 may be configured to evaluate the engagement of the social media post made by the influencer based on number of followers following the influencer before the social media post, and the number of followers following the influencer after the social media post. Here, the number of followers is acting as a control variable for evaluating the engagement score.

Moreover, in a specific embodiment, the scoring module 80 may be configured to compute the engagement score of the at least one of the social media post based on an engagement rate of the at least one of the social media post. In such an embodiment, the engagement rate may be evaluated by dividing sum of at least one of the number of likes, the number of shares, the number of comments and number of saves, number of direct messages, number of story views, number of story replies, number of stickers, and number of reactions secured by the at least one of the social media post with number of followers of the influencer. In some embodiment, the one or more users may engage with the at least one of the social media post upon registration. In some embodiments, the one or more users may only be able to view the at least one of the social media post without registering themselves in the integrated database. In one embodiment, the scoring module 80 may be configured to identify engagement saturation based on a ratio of the engagement score and a predefined amount of money spent for at least one of the social media post.

Additionally, in one embodiment, the scoring module 80 may be configured to compute advertisement revenue based on the engagement score evaluated. In such an embodiments, the scoring module 80 may disburse the advertisement revenue to the follower based on an interaction of the followers with the at least one of the social media post. In detail, consider a scenario in which at least one of the social media post of the influence is aimed to promote a hotel. The follower may post a review of the hotel in at least one of the social media post and the review may attract one or more responses from the public. The scoring module may initially evaluate the engagement score of the social media post and calculate the advertisement revenue based on the engagement score. The scoring module may further disburse a portion of the advertisement revenue to the follower based on the one or more responses attracted by the review. In continuation with the ongoing example, consider a scenario in which at least one of the social media post made by the influencer Y may secure 5 hash tags from the follower. The scoring module 80 may compute the engagement score based on the 5 hash tags secured by the at least one of the social media post.

Figure 2:
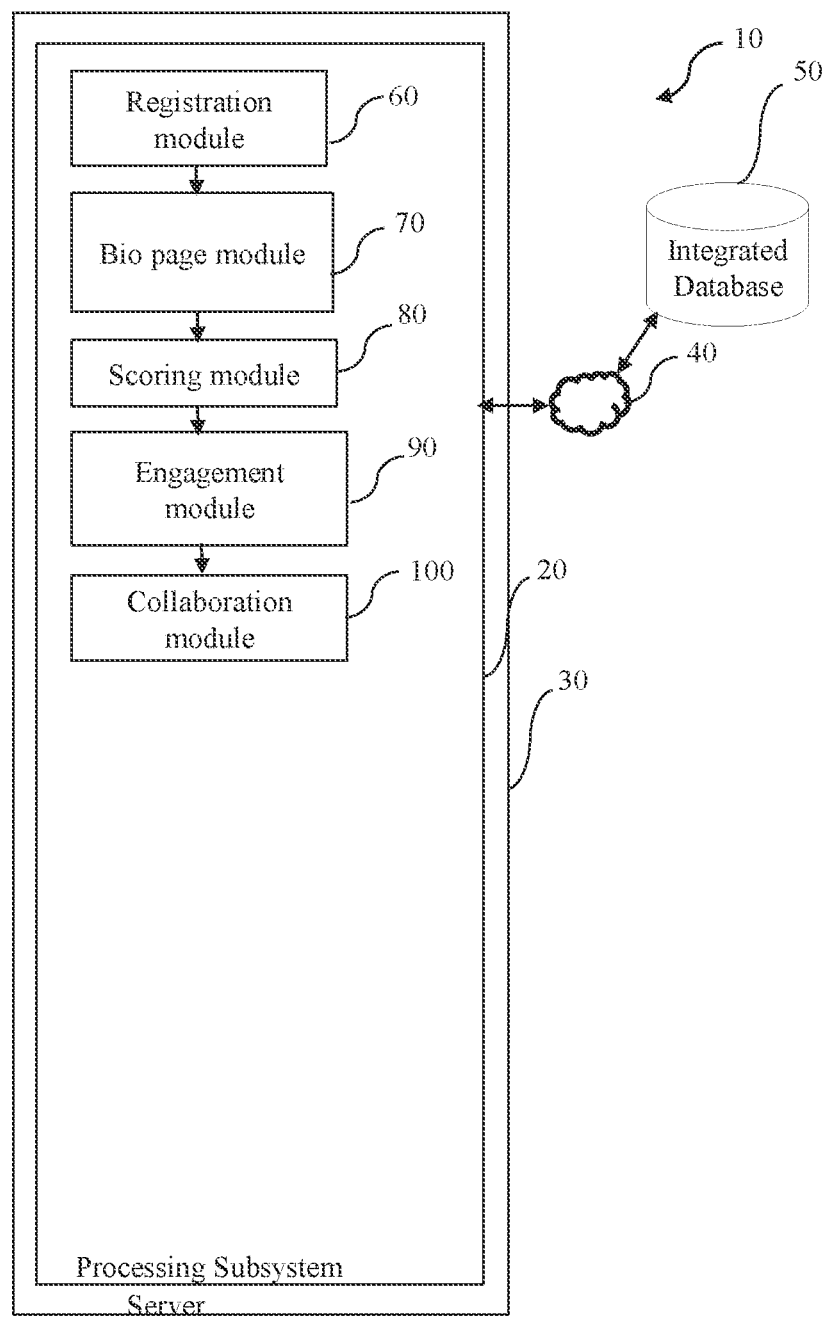
FIG. 2 is a block diagram representation of one embodiment of the system of FIG. 1 in accordance with an embodiment of the present disclosure.

FIG. 2 is a block diagram representation of one embodiment of the system 10 of FIG. 1 in accordance with an embodiment of the present disclosure. The system 10 of FIG. 1 includes the registration module 60, the bio page module 70, and the scoring module 80. In one embodiment, the system 10 of FIG. 1 may include the processing subsystem 20 including an engagement module 90 configured to submit at least one of the social media post made by the one or more users in the corresponding user profile to the one or more social media platforms through the corresponding application programing interfaces. In continuation with the ongoing example, consider a scenario in which, the influencer Y may submit the at least one of the social media post in the user profile associated with the influencer Y. The engagement module 90 may post the at least one of the social media post submitted by the influencer Y to the one or more social media platforms linked with the user profile of the influencer Y through the corresponding application programming interfaces. In one embodiment, the engagement module may be configured to modify the at least one of the social media post to achieve a plurality of criteria comprising clarity, conciseness, compliance with local laws, coherent, and an appropriate tonality.

Further, in one embodiment, the processing subsystem 20 may include a collaboration module 100 configured to link the corresponding user profile of the brand and the corresponding user profile of the influencer upon receiving a request from at least one of the brand and the influencer. In such an embodiment, the collaboration module 100 may be configured to provide access to the brand to view the engagement score of the at least one of the social media post upon linking the corresponding user profile of the brand and the corresponding user profile of the influencer. In continuation with the ongoing example, consider the scenario in which, the brand X may be interested to collaborate with the influencer Y. The collaboration module 100 may link the user profile of the brand X to the user profile of the influencer Y upon receiving the request from at least one of the brand X and the influencer Y. The collaboration module 100 may provide access to the brand X to view the engagement score of the at least one of the social media post upon linking the c user profile of the brand X and the user profile of the influencer Y.

Figure 3:
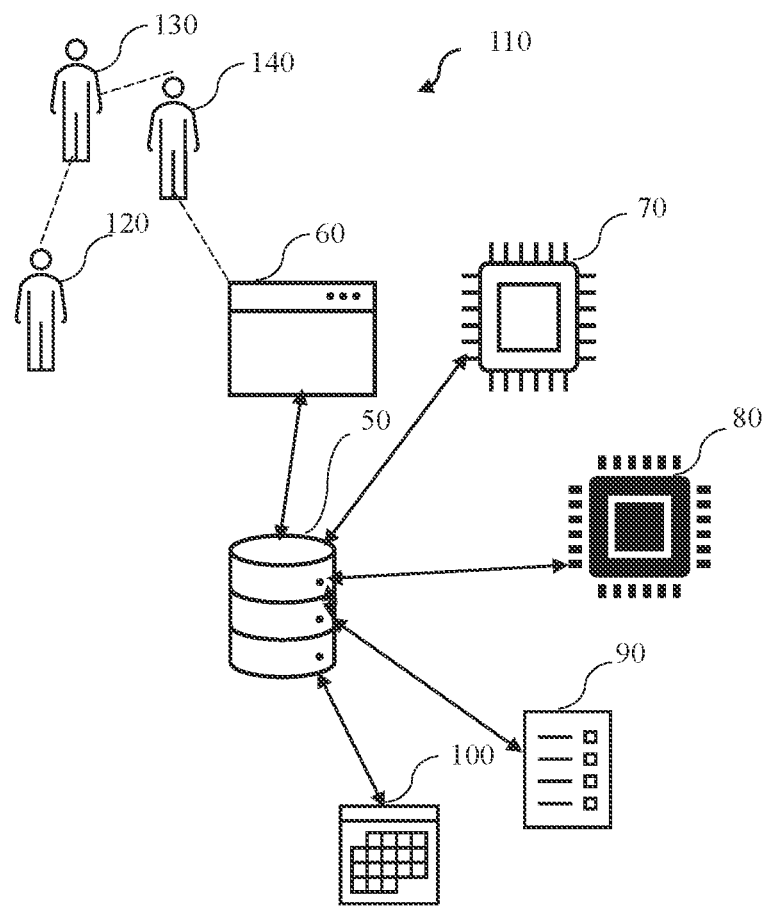
FIG. 3 is a schematic representation of an exemplary embodiment of the system of FIG. 1, in accordance with an embodiment of the present disclosure.

FIG. 3 is a schematic representation of an exemplary embodiment 110 of the system 10 of FIG. 1 in accordance with an embodiment of the present disclosure. For example, consider a scenario in which, the registration module 60 may register a brand A 120, an influencer B 130 and a follower C 140 in the integrated database 50 by creating the corresponding user profile upon receiving respective email address and phone numbers of the brand A 120, the influencer B 130 and the follower C 140. The brand A 120 may be operating a facebook page, the influencer B 130 may be operating the facebook page, an instagram account, and a twitter account, and a follower may be operating the facebook page and the instagram account. Upon creating the corresponding user profile of the brand A 120, the registration module 60 may link the facebook page associated with the brand A 120 to the corresponding user profile of the brand A 120.

Further, similarly, upon creating the corresponding user profile of the influencer B 130, the registration module 60 may link the facebook page, the instagram account, and the twitter account associated with the influencer B 130 to the corresponding user profile of the influencer B 130. The registration module 60 may also link the facebook page and the instagram account associated with the follower C 140 to the corresponding user profile of the follower C 140. The bio page module 70 may fetch the number of likes, the number of mentions, the number of comments, the number of shares and the number of hashtags, and the reach secured by the facebook page of the brand A 120 to render the same in the graphical user interface of the computer of the brand A 120. The bio page module 70 may generate the hash value corresponding to the number of likes, the number of mentions, the number of comments, the number of shares and the number of hashtags, and the reach secured by the facebook page of the brand A 120 to append the same in the blockchain network.

Furthermore, similarly, the bio page module 70 may fetch the number of likes, the number of mentions, the number of comments, the number of shares and the number of hashtags, and the reach secured by the facebook page, the instagram account, and the twitter account associated with the influencer B 130 to render the same in the graphical user interface of the phone of the influencer B 130. The bio page module 70 may generate the hash value corresponding to the number of likes, the number of mentions, the number of comments, the number of shares and the number of hashtags, and the reach secured by the facebook page of the influencer B 130 to append the same in the blockchain network.

Also, the bio page module 70 may fetch the number of likes, the number of mentions, the number of comments, the number of shares and the number of hashtags, and the reach secured by the facebook page, and the instagram account associated with the follower C 140 to render the same in the graphical user interface of the phone of the follower C 140. The bio page module 70 may generate the hash value corresponding to the number of likes, the number of mentions, the number of comments, the number of shares and the number of hashtags, and the reach secured by the facebook page of the follower C 140 to append the same in the blockchain network. The scoring module 80 may normalize the number of likes, the number of shares and the number of comments secured by the at least one of the social media post made by the influencer B 130 to obtain respective normalized values.

Additionally, consider a scenario in which at least one of the social media post of the influencer B 130 has secured 5 likes, 10 comments and 3 shares and the corresponding normalized values are 0.5, 0.1 and 0.3 respectively. Consider an instance in which the corresponding weight assigned to likes, comments and shares may be 10, 20 and 15 respectively. The scoring module 80 may multiply 0.5, 0.1 and 0.3 with the corresponding weights and add the results to obtain the engagement score as follows. $(0.5\times10)+(0.1\times20)+(0.3\times15)=11.5$. Consider the scenario in which out of the 5 likes secured by the at least one of the social media post of the influencer B 130 includes 3 happy emoticons, 1 neutral emoticon and 1 angry emoticon. The sentiment polarity evaluated by the scoring module 80 may be the positive sentiment polarity considering the 3 happy emoticons.

Moreover, the scoring module 80 may compute the corresponding weight of the normalized number of likes based on the at least one sentiment polarity evaluated. In one embodiment, the scoring module 80 may also evaluate the sentiment polarity based on a skin tone of the one or more emoticons selected by the audience.

Further, consider another scenario in which, the 10 comments secured by at least one of the social media post of the influencer B 130 include a total of 50 words. The scoring module 80 may also try to analyze tonality of each of the 10 comments through a plurality of steps including tokenization, text preprocessing, feature extraction, sentiment analysis, and tonality analysis. In detail, tokenization involves breaking each of the 10 comments into words, and phrases. The text preprocessing involves removal of noise and irrelevant information from the words and phrases. Further the words and the phrases may get converted into corresponding numerical vectors using in the feature extraction step.

Later, during the sentimental analysis step, various underlying sentiments from the words are figured out. Once the underlying sentiments are figured out, the tonality analysis of the words are performed using trained natural language processing models to identify various emotions associated with the words. The natural language processing technique may also evaluate the tone intensity of each of the 10 comments. The scoring module 80 may be configured to compute the corresponding weight of the normalized number of comments based on number of words present in one or more comments secured by the at least one of the social media post, tonality of the one or more comments, tone intensity of the one or more comments, and persona profile of the one or more users. In one embodiment, the scoring module 80 may evaluate the engagement score based on the persona profile of the one or more users.

Moreover, consider another scenario in which number of social media posts made by the influencer B 130 for one week may be as follows: 8, 15, 12, 8, 18, 20, 10. The scoring module 80 may calculate the average of total number of the social media posts made by the influencer B 130 for one week as 13 and the frequency of deviation for the week is 5, −2, 1, 5, −5, −7, and 3. The scoring module 80 may also calculate the volatility as 1.04 by diving the standard deviation of 4.16 by the mean deviation of 4. Based on the frequency of deviation calculated, the scoring module 80 may infer a relatively high level of variation in daily performance and may compute the engagement score accordingly.

Additionally, consider another scenario in which at least one of the social media post made by the influencer B 130 may secure 5 hash tags from the follower. The scoring module 80 may compute the engagement score based on the 5 hash tags secured by the at least one of the social media post.

Also, consider another scenario in which, the influencer B 130 may submit the at least one of the social media post in the user profile associated with the influencer B 130. The engagement module 90 may post the at least one of the social media post submitted by the influencer B 130 to the one or more social media platforms linked with the user profile of the influencer B 130 through the corresponding application programming interfaces.

Consider another scenario in which, the brand A 120 may be interested to collaborate with the influencer B 130. The collaboration module 100 may link the user profile of the brand A 120 to the user profile of the influencer B 130 upon receiving the request from at least one of the brand A 120 and the influencer B 130. The collaboration module 100 may provide access to the brand A 120 to view the engagement score of the at least one of the social media post upon linking the c user profile of the brand A 120 and the user profile of the influencer B 130.

Figure 4:
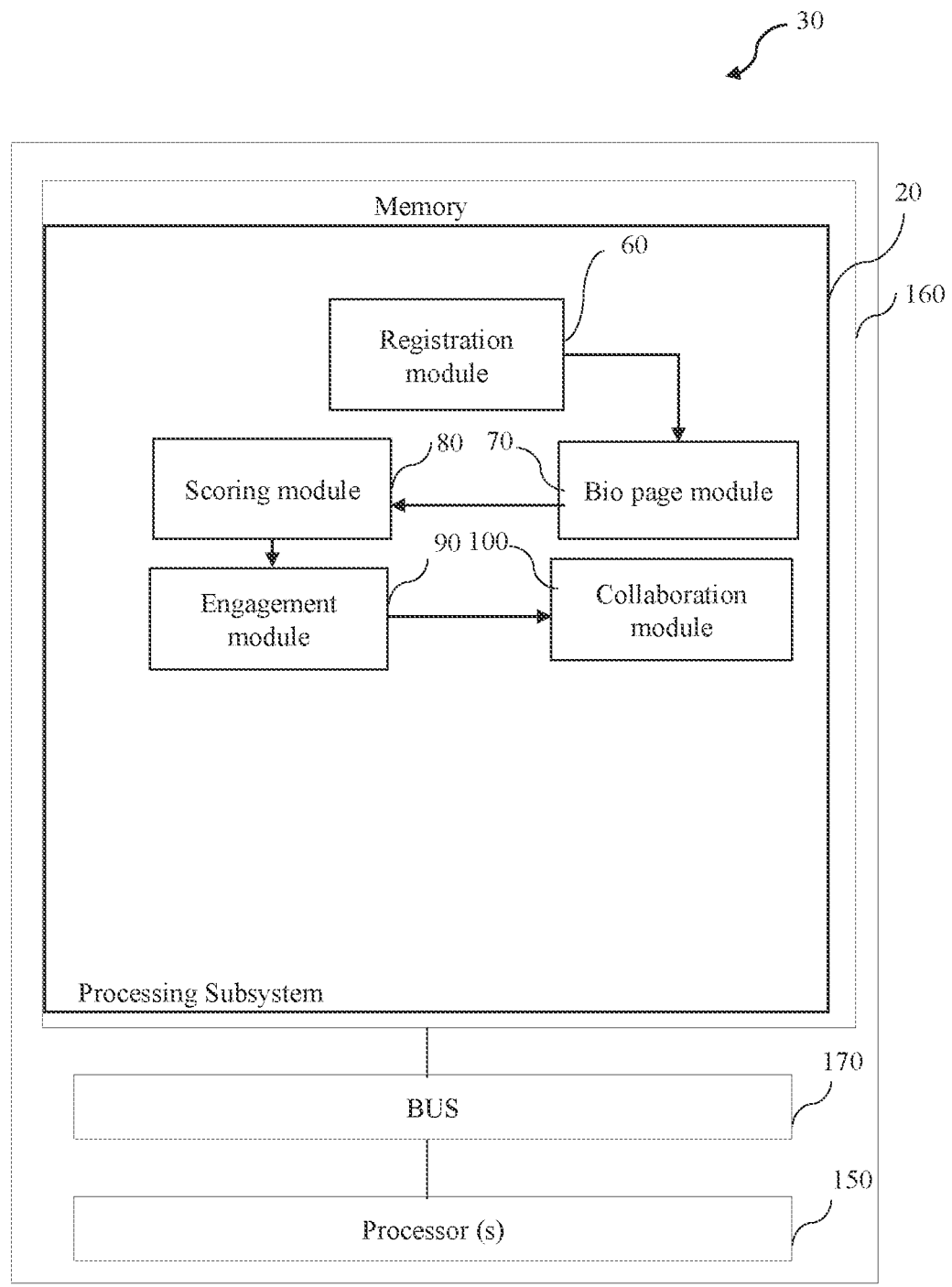
FIG. 4 is a block diagram of a computer or a server in accordance with an embodiment of the present disclosure.

FIG. 4 is a block diagram of a computer or a server 30 in accordance with an embodiment of the present disclosure. The server 30 includes processor(s) 150, and memory 160 operatively coupled to the bus 170. The processor(s) 150, as used herein, includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 160 includes several subsystems stored in the form of executable program which instructs the processor to perform the method steps illustrated in FIG. 1. The memory 160 is substantially similar to the system 10 of FIG. 1. The memory 160 has the following subsystems: the processing subsystem 20 including the registration module 60, the bio page module 70, the scoring module 80, the engagement module 90, the engagement module 90 and the collaboration module 100. The plurality of modules of the processing subsystem 20 performs the functions as stated in FIG. 1 and FIG. 2. The bus 170 as used herein refers to be the internal memory channels or computer network that is used to connect computer components and transfer data between them. The bus 170 includes a serial bus or a parallel bus, wherein the serial bus transmit data in bit-serial format and the parallel bus transmit data across multiple wires. The bus 170 as used herein, may include but not limited to, a system bus, an internal bus, an external bus, an expansion bus, a frontside bus, a backside bus, and the like.

The processing subsystem 20 includes a registration module 60 operatively coupled to an integrated database 50. The registration module 60 is configured to register one or more users in an integrated database 50 by creating corresponding user profile upon receiving one or more user details. The one or more users includes a brand, an influencer, and a follower. The registration module 60 is also configured to link one or more social media platforms associated with each of the one or more users with the corresponding user profile upon registering the one or more users. The processing subsystem 20 also includes a bio page module 70 operatively coupled to the registration module 60. The bio page module 70 is configured to fetch a plurality of parameters corresponding to at least one of the social media post from each of the one or more social media platforms through a corresponding application programing interface to render the plurality of parameters in a user interface associated with a user device. The plurality of parameters includes number of likes, number of mentions, number of comments, number of shares and number of hashtags, and reach. The bio page module 70 is also configured to generate hash value corresponding to the plurality of parameters to append the plurality of parameters in a blockchain network. The processing subsystem 20 also includes a scoring module 80 operatively coupled to the bio page module 70. The scoring module 80 is configured to normalize the number of likes, the number of shares and the number of comments secured by the at least one of the social media post during a predefined interval to obtain normalized number of likes, normalized number of shares and the normalized number of comments respectively. The scoring module 80 is also configured to add the normalized number of likes, normalized number of shares and the normalized number of comments upon multiplying the normalized number of likes, normalized number of shares and the normalized number of comments with corresponding weight to obtain the engagement score, thereby evaluating the engagement score of at least one of the social media post. The processing subsystem 20 also includes an engagement module 90 configured to submit a post made by the one or more users in the corresponding user profile to the one or more social media platforms through the corresponding application programing interfaces.

The processing subsystem 20 further includes a collaboration module 100 configured to link the corresponding user profile of the brand A 120 and the corresponding user profile of the influencer upon receiving a request from at least one of the brand A 120 and the influencer. The collaboration module 100 is also configured to provide access to the brand to view the engagement score of the at least one of the social media post upon linking the corresponding user profile of the brand A 120 and the corresponding user profile of the influencer.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 150.

Figure 5:
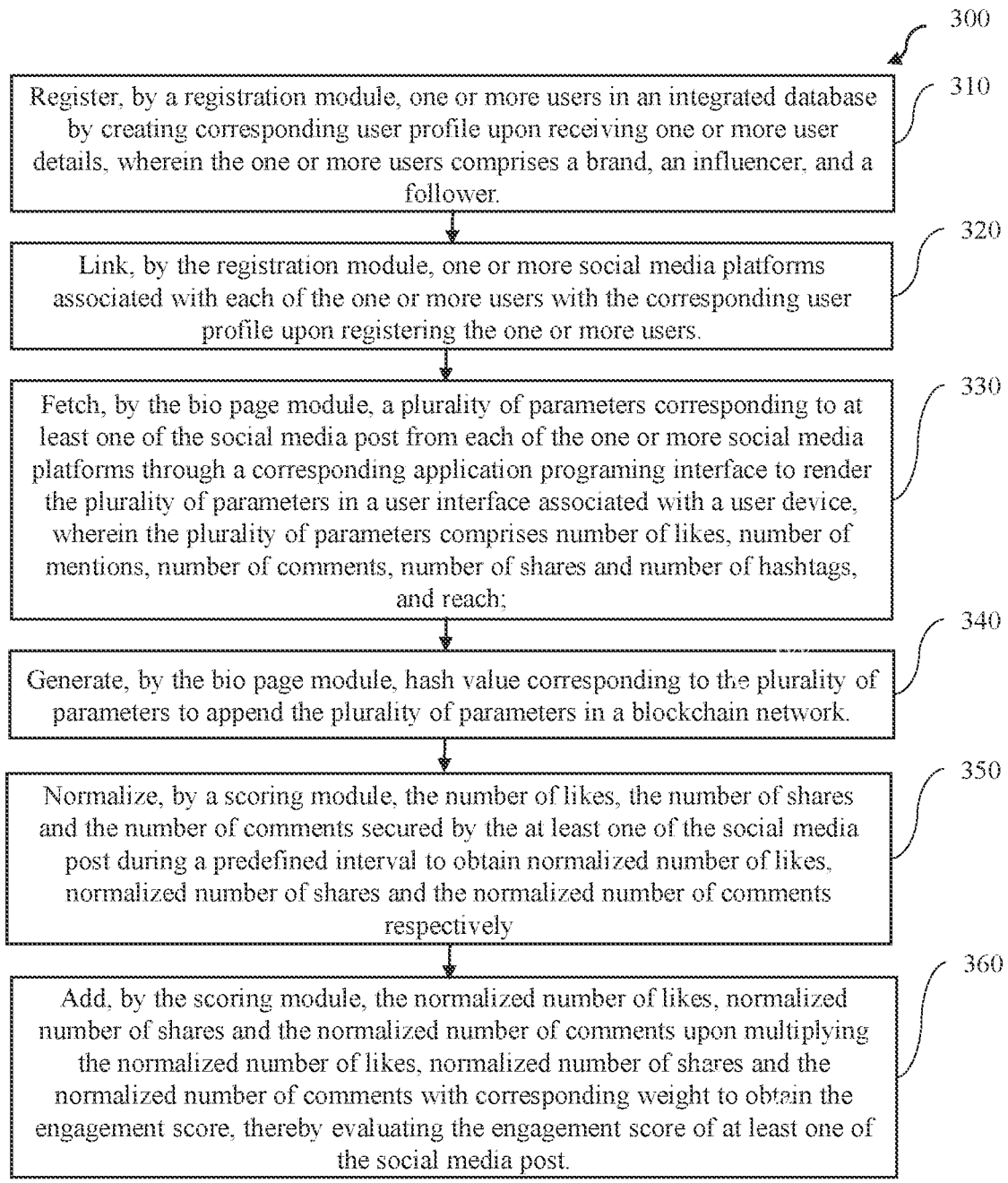
FIG. 5 is a flow chart representing the steps involved in a method to evaluate engagement score of at least one of a social media post in accordance with an embodiment of the present disclosure.

FIG. 5 is a flow chart representing the steps involved in a method 300 to evaluate engagement score of at least one of a social media post in accordance with an embodiment of the present disclosure. The method 300 includes registering one or more users in an integrated database by creating corresponding user profile upon receiving one or more user details in step 310. In one embodiment, registering one or more users in an integrated database by creating corresponding user profile upon receiving one or more user details includes registering one or more users in an integrated database by creating corresponding user profile upon receiving one or more user details by a registration module. The one or more users include a brand, an influencer, and a follower. In one embodiment, the one or more user details may include an email address and a phone number. In one embodiment, the integrated database may include a structured query language database. In some embodiments, the integrated database may include a non-structured query language database.

The method 300 also includes linking one or more social media platforms associated with each of the one or more users with the corresponding user profile upon registering the one or more users in step 320. In one embodiment, linking one or more social media platforms associated with each of the one or more users with the corresponding user profile upon registering the one or more users includes linking one or more social media platforms associated with each of the one or more users with the corresponding user profile upon registering the one or more users by the registration module.

The method 300 further includes fetching a plurality of parameters corresponding to at least one of the social media post from each of the one or more social media platforms through a corresponding application programing interface to render the plurality of parameters in a user interface associated with a user device in step 330. In one embodiment, fetching a plurality of parameters corresponding to at least one of the social media post from each of the one or more social media platforms through a corresponding application programing interface to render the plurality of parameters in a user interface associated with a user device includes fetching a plurality of parameters corresponding to at least one of the social media post from each of the one or more social media platforms through a corresponding application programing interface to render the plurality of parameters in a user interface associated with a user device by the bio page module. The plurality of parameters includes number of likes, number of mentions, number of comments, number of shares and number of hashtags, and reach. In one embodiment, the user device may include a phone, a computer, a tab and a personal digital assistant. In one embodiment, the blockchain network may include a public blockchain network. In some embodiments, the blockchain network may include a private blockchain network. In a specific embodiment, the blockchain network may include a shared blockchain network.

The method 300 also includes generating hash value corresponding to the plurality of parameters to append the plurality of parameters in a blockchain network in step 340. In one embodiment, hash value corresponding to the plurality of parameters to append the plurality of parameters in a blockchain network includes hash value corresponding to the plurality of parameters to append the plurality of parameters in a blockchain network, by the bio page module.

The method 300 further includes normalizing the number of likes, the number of shares and the number of comments secured by the at least one of the social media post during a predefined interval to obtain normalized number of likes, normalized number of shares and the normalized number of comments respectively in step 350. In one embodiment, normalizing the number of likes, the number of shares and the number of comments secured by the at least one of the social media post during a predefined interval to obtain normalized number of likes, normalized number of shares and the normalized number of comments respectively includes normalizing the number of likes, the number of shares and the number of comments secured by the at least one of the social media post during a predefined interval to obtain normalized number of likes, normalized number of shares and the normalized number of comments respectively, by a scoring module. In one embodiment, the predefined interval may include days, months, and years.

The method 300 further includes adding the normalized number of likes, normalized number of shares and the normalized number of comments upon multiplying the normalized number of likes, normalized number of shares and the normalized number of comments with corresponding weight to obtain the engagement score, thereby evaluating the engagement score of at least one of the social media post in step 360. In one embodiment, adding the normalized number of likes, normalized number of shares and the normalized number of comments upon multiplying the normalized number of likes, normalized number of shares and the normalized number of comments with corresponding weight to obtain the engagement score, thereby evaluating the engagement score of at least one of the social media post includes adding the normalized number of likes, normalized number of shares and the normalized number of comments upon multiplying the normalized number of likes, normalized number of shares and the normalized number of comments with corresponding weight to obtain the engagement score, thereby evaluating the engagement score of at least one of the social media post, by the scoring module.

Further, in one embodiment, the scoring module may be configured to evaluate at least one sentiment polarity associated with the number of likes secured by the at least one of the social media post based on selection of one or more emoticons associated with the at least one of the social media post by an audience. As used herein, the one or more emoticons may be defined as combinations of keyboard characters used to represent facial expressions or convey emotions in written communication, such as text messages, emails, and online chat. In one embodiment the at least one sentiment polarity may include positive sentiment polarity, negative sentiment polarity, and neutral sentiment polarity. In such an embodiment, the scoring module may also be configured to compute the corresponding weight of the normalized number of likes based on the at least one sentiment polarity evaluated. In one embodiment, the positive sentiment polarity, negative sentiment polarity, and neutral sentiment polarity may be represented by a sentiment intensity score lies between zero and a positive value, zero and a negative value, and zero respectively.

Furthermore, in one embodiment, the scoring module may be configured to compute the corresponding weight of the normalized number of comments based on number of words present in one or more comments secured by the at least one of the social media post, tonality of the one or more comments, tone intensity of the one or more comments, and persona profile of the one or more users. In such an embodiment, the tonality of one or more comments may include a first category and a second category. In one embodiment, the first category may include joyful tone, sad tone, angry tone, and fearful tone. In some embodiments, the second category may include analytical tone, tentative tone, and confident tone. In one embodiment, the tone intensity lies between zero and one. In such an embodiment, zero may represent absence of any tone and a positive value between the zero and one represents presence of a tone.

Additionally, in one embodiment, the scoring module may be configured to compute the engagement score of the at least one of the social media post based on at least one of a frequency of deviation, and a volatility of the at least one of the social media post. In such an embodiment, the frequency of deviation may be calculated by subtracting average number of social media posts from number of at least one of the social media post during a predefined time period. In one embodiment, the predefined time period may include days, months, and years. In one embodiment, the volatility may be calculated by dividing standard deviation of number of at least one of the social media post by mean deviation of the number of at least one of the social media post.

Also, in some embodiments, the scoring module may be configured to compute the engagement score of the at least one of the social media post based on one or more lingos secured by the at least one of the social media post. In such an embodiment, the one or more lingos may include at least one of symbols comprising @, #, retweet, a universal resource locator, an emoji, an emoticon, abbreviations, and capitalizations. In continuation with the ongoing example, consider a scenario in which at least one of the social media post made by the influencer Y may secure 5 hash tags from the follower. The scoring module may compute the engagement score based on the 5 hash tags secured by the at least one of the social media post.

Various embodiments of the system and method to evaluate engagement score of at least one of a social media post described above enable various advantages. The registration module provides a way to register the one or more users in the integrated database and integrating the one or more social media platforms of the one or more users to the corresponding user profiles, thereby ensuring seamless integration of the multiple social media platforms to the corresponding user profile. The bio page module is capable of fetching the plurality of parameters corresponding to at least one of the social media post from each of the one or more social media platforms and rendering the same in the user interface associated with the user device, thereby providing one or more insights to the one or more users regarding the performance of the at least of the social media post.

Also, the bio page module is capable of appending the plurality of parameters in the blockchain network to make the plurality of parameters tamperproof, thereby enabling the brand and the influencer to collaborate by ensuring transparency and accountability. The scoring module is capable of evaluating the engagement score of the at least one of the social media post through various methods, thereby assisting the brand and the influencer to take informed decisions in various aspects such as revenue sharing, future collaborations, and content strategy and the like. The collaboration module is capable of linking the brand and the influencer upon receiving the request from at least one of the brand and the influencer, thereby supporting cost effective digital marketing.

Further, the engagement module is capable of submitting the post made by the one or more users in the corresponding user profile to the one or more social media platforms through the corresponding application programing interfaces, thereby saving time and effort of the influencer along with reducing chances of errors while creating creation of the post.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. A system to evaluate engagement score of at least one of a social media post comprising:
 a hardware processor; and
 a memory coupled to the hardware processor, wherein the memory comprises a set of program instructions in the form of a processing subsystem, configured to be executed by the hardware processor, wherein the processing subsystem hosted on a server and configured to execute on a network to control bidirectional communications among a plurality of modules comprising:
  a registration module operatively coupled to an integrated database, wherein the registration module is configured to:
   register one or more users in integrated database by creating a corresponding user profile upon receiving one or more user details, wherein the one or more users comprises a brand, an influencer, and a follower;
   link one or more social media platforms associated with each of the one or more users with the corresponding user profile upon registering the one or more users;
  a bio page module operatively coupled to the registration module, wherein the bio page module is configured to:
   fetch a plurality of parameters corresponding to at least one of the social media post from each of the one or more social media platforms through a corresponding application programing interface to render the plurality of parameters in a user interface associated with a user device,
   wherein the plurality of parameters comprises number of likes, number of mentions, number of comments, number of shares and number of hashtags, and reach;

generate hash value corresponding to the plurality of parameters to append the plurality of parameters in a blockchain network;

a scoring module operatively coupled to the bio page module, wherein the scoring module is configured to:

normalize the number of likes, the number of shares and the number of comments secured by the at least one of the social media post during a predefined interval to obtain normalized number of likes, normalized number of shares and the normalized number of comments respectively; and add the normalized number of likes, normalized number of shares and the normalized number of comments upon multiplying the normalized number of likes, normalized number of shares and the normalized number of comments with corresponding weight to obtain the engagement score, thereby evaluating the engagement score of at least one of the social media post.

2. The system of claim 1, wherein the blockchain network comprises a public blockchain network.

3. The system of claim 1, wherein the blockchain network comprises a private blockchain network.

4. The system of claim 1, wherein the blockchain network comprises a shared blockchain network.

5. The system of claim 1, wherein the one or more user details comprises an email address and a phone number.

6. The system of claim 1, wherein the scoring module is configured to:

evaluate at least one sentiment polarity associated with the number of likes secured by the at least one of the social media post based on selection of one or more emoticons associated with the at least one of the social media post by an audience, wherein the at least one sentiment polarity comprises positive sentiment polarity, negative sentiment polarity, and neutral sentiment polarity; and compute the corresponding weight of the normalized number of likes based on the at least one sentiment polarity evaluated.

7. The system of claim 6, wherein the positive sentiment polarity, negative sentiment polarity, and neutral sentiment polarity are represented by a sentiment intensity score lies between zero and a positive value, zero and a negative value, and zero respectively.

8. The system of claim 1, wherein the scoring module is configured to compute the corresponding weight of the normalized number of comments based on number of words present in one or more comments secured by the at least one of the social media post, tonality of the one or more comments, and tone intensity of the one or more comments.

9. The system of claim 8, wherein the tonality of one or more comments comprises a first category and a second category, wherein the first category comprises joyful tone, sad tone, angry tone, and fearful tone, wherein the second category comprises analytical tone, tentative tone, and confident tone.

10. The system of claim 8, wherein the tone intensity lies between zero and one, wherein the zero represents absence of any tone and a positive value between the zero and one represents presence of a tone.

11. The system as claimed in claim 1, wherein the processing subsystem comprises an engagement module configured to submit a post made by the one or more users in the corresponding user profile to the one or more social media platforms through the corresponding application programing interfaces.

12. The system of claim 1, wherein the processing subsystem comprises a collaboration module configured to:

link the corresponding user profile of the brand and the corresponding user profile of the influencer upon receiving a request from at least one of the brand and the influencer;

provide access to the brand to view the engagement score of the at least one of the social media post upon linking the corresponding user profile of the brand and corresponding user profile of the influencer.

13. The system of claim 1, wherein the scoring module is configured to compute the engagement score of the at least one of the social media post based on at least one of a frequency of deviation, and a volatility of the at least one of the social media post, wherein the frequency of deviation is calculated by subtracting average number of social media posts from number of at least one of the social media post during a predefined time period, wherein the volatility is calculated by dividing standard deviation of number of at least one of the social media post by mean deviation of the number of at least one of the social media post.

14. The system of claim 1, wherein the scoring module is configured to compute the engagement score of the at least one of the social media post based on one or more lingos secured by the at least one of the social media post, wherein the one or more lingos comprises at least one of symbols comprising @, #, retweet, a universal resource locator, and an emoji.

15. The system of claim 1, wherein the integrated database comprises a structured query language database.

16. The system of claim 1, wherein the integrated database comprises a non-structured query language database.

17. The system of claim 1, wherein the network comprises a local area network.

18. The system of claim 1, wherein the network comprises a wide area network.

19. A method to evaluate engagement score of at least one of a social media post comprising:

registering, by a registration module, one or more users in an integrated database by creating a corresponding user profile upon receiving one or more user details, wherein the one or more users comprises a brand, an influencer, and a follower;

linking, by the registration module, one or more social media platforms associated with each of the one or more users with the corresponding user profile upon registering the one or more users;

fetching, by bio page module, a plurality of parameters corresponding to at least one of the social media post from each of the one or more social media platforms through a corresponding application programing interface to render the plurality of parameters in a user interface associated with a user device, wherein the plurality of parameters comprises number of likes, number of mentions, number of comments, number of shares and number of hashtags, and reach;

generating, by the bio page module, hash value corresponding to the plurality of parameters to append the plurality of parameters in a blockchain network;

normalizing, by a scoring module, the number of likes, the number of shares and the number of comments secured by the at least one of the social media post during a predefined interval to obtain normalized number of likes, normalized number of shares and the normalized number of comments respectively; and adding, by the scoring module, the normalized number of likes, normalized number of shares and the normalized number of comments upon multiplying the normalized number of likes, normalized number of shares and the normalized number of comments with corresponding weight to obtain the engagement score, thereby evaluating the engagement score of at least one of the social media post.

20. A non-transitory computer-readable medium storing a computer program that, when executed by a processor, causes the processor to perform a method to manage a contract between a plurality of parties comprising:

registering, by a registration module, one or more users in an integrated database by creating corresponding user profile upon receiving one or more user details, wherein the one or more users comprises a brand, an influencer, and a follower;

linking, by the registration module, one or more social media platforms associated with each of the one or more users with the corresponding user profile upon registering the one or more users;

fetching, by bio page module, a plurality of parameters corresponding to at least one of the social media post from each of the one or more social media platforms through a corresponding application programing interface to render the plurality of parameters in a user interface associated with a user device, wherein the plurality of parameters comprises number of likes, number of mentions, number of comments, number of shares and number of hashtags, and reach;

generating, by the bio page module, hash value corresponding to the plurality of parameters to append the plurality of parameters in a blockchain network;

normalizing, by a scoring module, the number of likes, the number of shares and the number of comments secured by the at least one of the social media post during a predefined interval to obtain normalized number of likes, normalized number of shares and the normalized number of comments respectively; and adding, by the scoring module, the normalized number of likes, normalized number of shares and the normalized number of comments upon multiplying the normalized number of likes, normalized number of shares and the normalized number of comments with corresponding weight to obtain the engagement score, thereby evaluating the engagement score of at least one of the social media post.

\* \* \* \* \*